March 27, 1951 K. O. FELLROTH 2,546,853
BOX TOOL
Filed Sept. 8, 1947 4 Sheets-Sheet 1
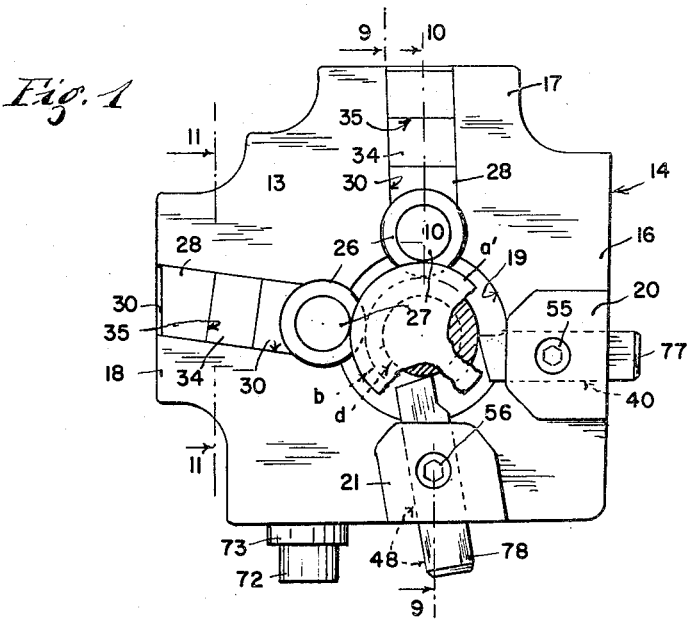
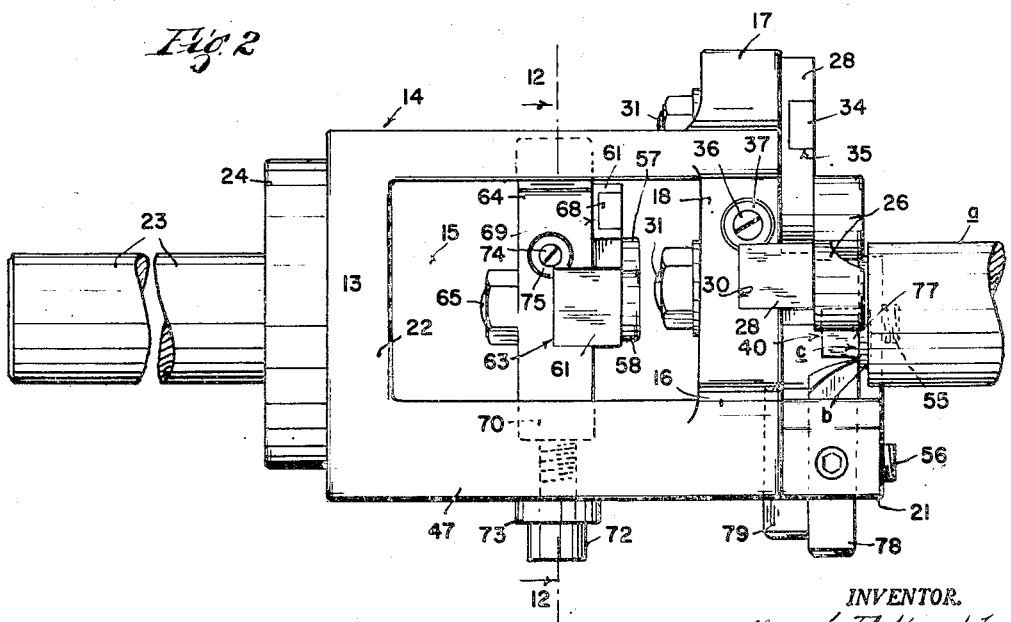
INVENTOR.
Karl Fellroth
BY Harry D. Kilgore
Attorney March 27, 1951 K. O. FELLROTH 2,546,853
BOX TOOL
Filed Sept. 8, 1947 4 Sheets-Sheet 2

INVENTOR.
Karl Fellroth
BY
Harry N. Kilgore
Attorney

March 27, 1951 K. O. FELLROTH 2,546,853
BOX TOOL
Filed Sept. 8, 1947 4 Sheets-Sheet 3
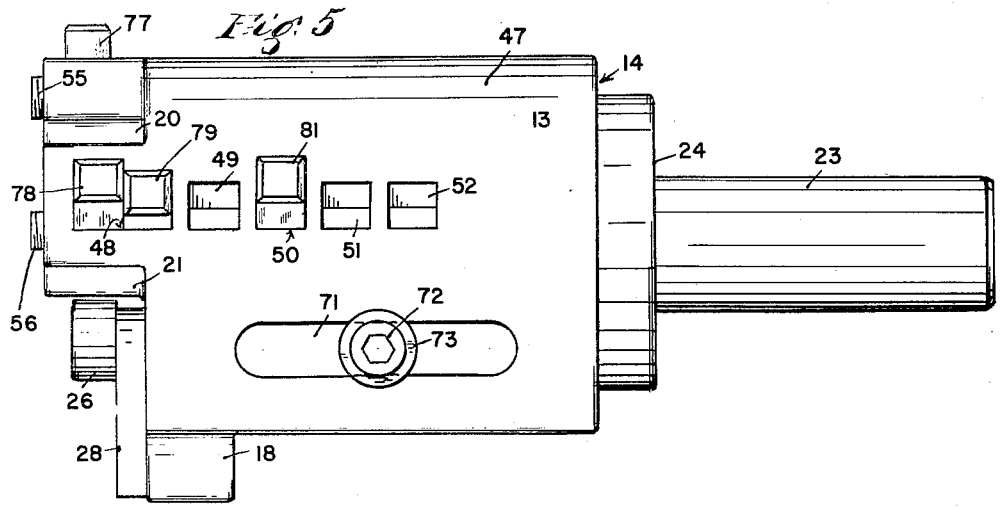
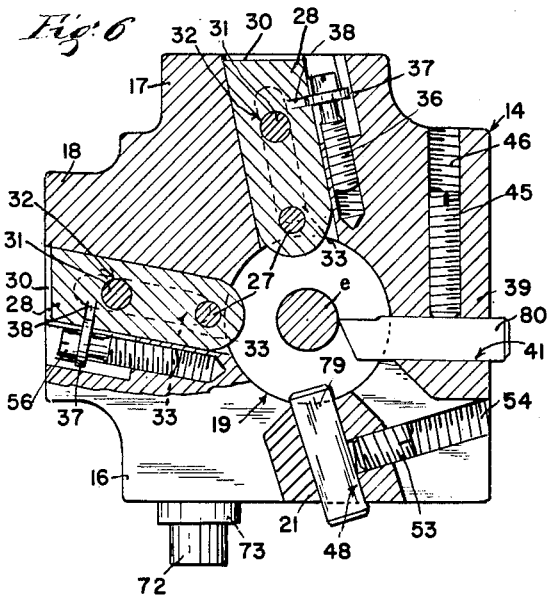 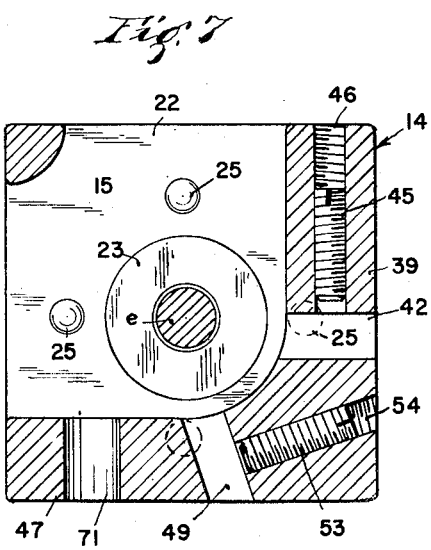
INVENTOR.
Karl Fellroth
BY Harry D. Kilgore
Attorney March 27, 1951 K. O. FELLROTH 2,546,853
BOX TOOL
Filed Sept. 8, 1947 4 Sheets-Sheet 4
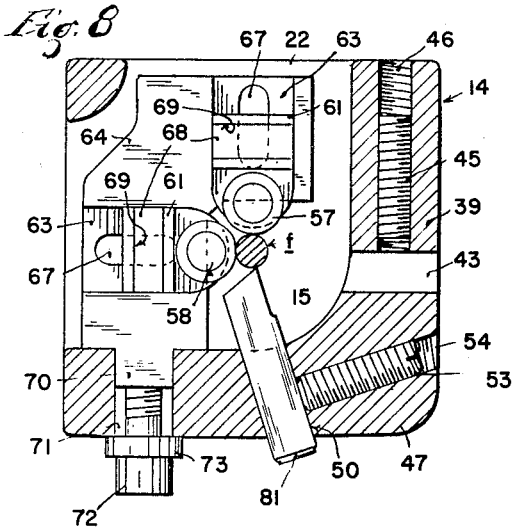
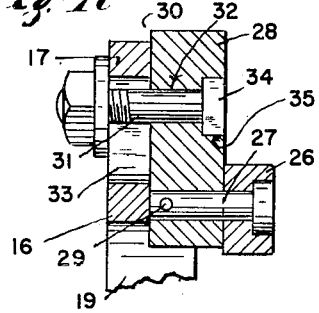
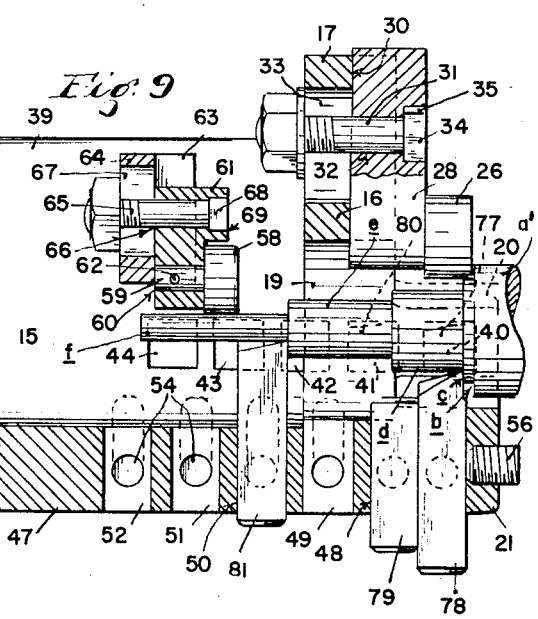
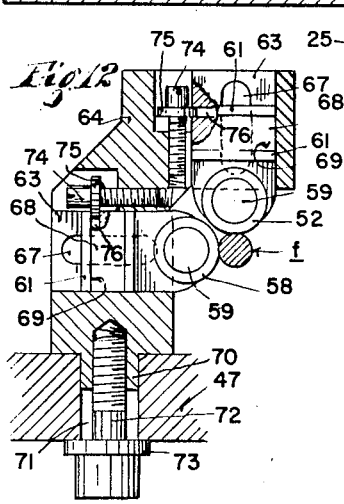
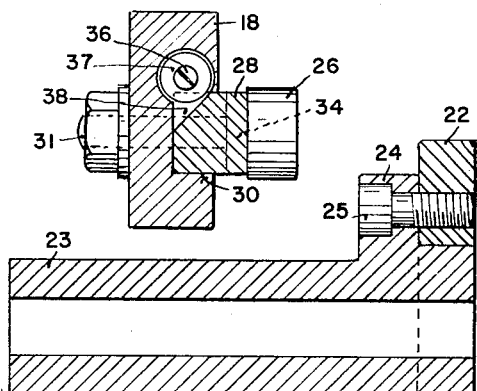
INVENTOR.
Karl Fellroth
BY Harry D. Kilgore
Attorney Patented Mar. 27, 1951

2,546,853

UNITED STATES PATENT OFFICE 2,546,853

BOX TOOL

Karl O. Fellroth, Minneapolis, Minn.

Application September 8, 1947, Serial No. 772,820

4 Claims. (Cl. 82—35)

My present invention relates to improvements in box tools.

The principal object of this invention is to embody in a single tool, applicable to a turret lathe, a screw machine and the like, all around versatility for different kinds of bar turning and due to novel arrangements of pressure rollers and adjustable tool bits, this box tool is capable of doing in one operation the work of a plurality of independent tools and eliminates the necessity of additional complex "tooling up" and allows "tool set-ups" that are otherwise not feasible.

Another object of this invention is to provide a box tool having the ability of making heavy cuts accurately, of turning a relief and making any combination of different "bar turning steps" of predetermined lengths and of predetermined diameters that are concentric, the one with the other.

Still another object of this invention is to provide a box tool that is not cumbersome, does not occupy too much space on a machine so that "complex set-ups" are possible without bumping into side tools and breaking them.

A further object of this invention is to provide a box tool having construction design that insures a rigid tool that does not shimmy, weave, chatter or have a jumpy feed.

A still further object of this invention is to provide a box tool having means for adjusting pressure rollers and tool bits so arranged as to face the operator and thus facilitate "set up."

Another object of this invention is to provide a box tool having work pressure rollers designed, arranged and mounted to exert equal pressure on tool bits engaging work at circumferentially spaced points allowing long cuts and holding concentricity.

Other objects of this invention will be apparent from the following description, reference being had to the drawings.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 1 is a front elevational view of the improved box tool;

Fig. 2 is a left side elevational view of the same;

Fig. 5 is a bottom plan view of the same;

Figure 3:
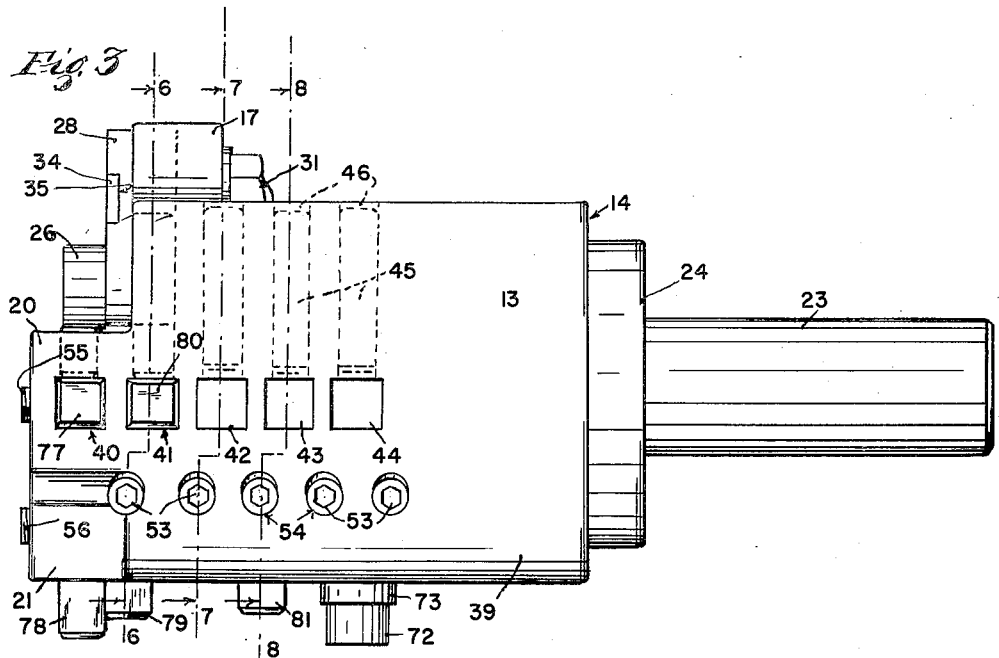
Fig. 3 is a right side elevational view of the same.
Figure 4:
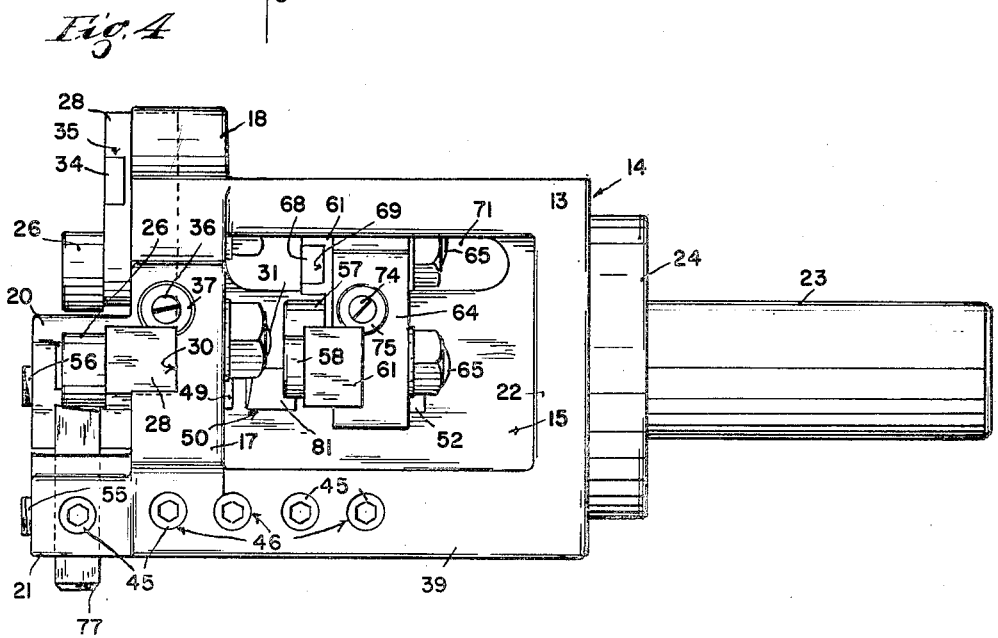
Fig. 4 is a top plan view of the improved box tool.

Figs. 6, 7 and 8 are views principally in transverse vertical section taken on the irregular lines 6—6, 7—7 and 8—8 of Fig. 3, respectively;

Fig. 9 is a longitudinal vertical section taken on the line 9—9 of Fig. 1;

Fig. 10 is a fragmentary detail view principally in section taken on the line 10—10 of Fig. 1;

Fig. 11 is a detail view principally in section taken on the line 11—11 of Fig. 1; and Fig. 12 is a detail view principally in section taken on the line 12—12 of Fig. 2.

The improved box tool 13 has an elongated rectangular body 14 provided with a compartment 15. The top and left-hand side of the body 14 are open to afford access to the compartment 15, and the latter affords a chip escape passageway. On the front end members 16 of the body 14 is an upstanding extension member 17, and on the left-hand side of said end member is an outwardly projecting extension 18. Both of the extensions 17 and 18 are integral with the end member 16.

In the front end member 16, at the center thereof, is an annular work passageway 19 that leads into the compartment 15. On the face of the front end member 16 and integral therewith is a tool post 20 and a tool post 21. The tool post 20 is at the right of the work passageway 19 and the tool post 21 is below said passageway. The two tool posts 20 and 21 are spaced apart to leave a chip escape passageway 20' therebetween. From a broad viewpoint, the tool posts 20 and 21 may be treated as a single post having a transverse chip escape passageway 20'.

Projecting rearwardly from the rear end member 22 of the body 14 is a tubular shank 23 for mounting the improved box tool on a turret lathe, a screw machine or a similar machine, not shown. This shank 23 is axially aligned with the work passageway 19 and its inner end portion is tightly fitted in a hole in the rear end member 22. Integral with the shank 23 is an annular flange 24 that bears against the rear end member 22 and is detachably secured thereto by a plurality of cap screws 25.

Two work-engaging pressure rollers 26 are journaled on headed studs 27, the axes of which are parallel to the projected axis of the work passageway 19. One of these rollers 26 is above the projected axis of the work passageway 19 and the other is to the left thereof. The studs 27 are mounted in transverse holes in rectangular carriers 28 and secured thereto by pins 29, see Fig. 10. These carriers 28 are slidably mounted in guide channels 30 in the face of the front end member 16. One of these guide channels 30 extends completely through the extension 17 and the other extends completely through the extension 18.

Movement of the carriers 28 carries the pressure rollers 26 thereon toward or from the projected axis of the work passageway 19. The carriers 28 are rigidly held in the guide channels 30, where adjusted, by nut-equipped bolts 31 that extend through holes 32 in said carriers and longitudinal slots 33 in the front end member 16 and the extensions 17 and 18. The heads 34 of the bolts 31 are rectangular and held in correspondingly formed seats 35 in the carriers 28 and thereby hold the bolts 31 from turning.

Motion is imparted to each carrier 28 by a long adjusting screw 36 to position the rollers 26 on a piece of work at the work passageway 19. These adjusting screws 36 extend parallel to the carriers 28 and have threaded engagement with the front end member 16. An annular collar 37 on each adjusting screw 36 extends into a transverse notch 38 in the adjacent carrier 28 and couples said carrier to the respective screw 36.

Formed in the tool post 20, the front end member 16 and the right-hand side member 39 of the body 16 is a horizontal row of laterally spaced seats 40, 41, 42, 43 and 44. These seats 40, 41, 42, 43 and 44 are square in cross-section and extend substantially radially relative to the axis and the projected axis of the work passageway 19. The seat 40 is in the tool post 20 and extends completely therethrough and the seat 41 is in the front end member 16 and opens into the work passageway 19. The seat 42 is in part in the front end member 16 and in part in the right-hand side member 39 and opens into the work passageway 19 and the compartment 15. Both seats 43 and 44 are in the right-hand side member 39 and open into the compartment 15.

Upright set-screws 45, above the seats 40, 41, 42, 43 and 44 are provided one of each of said seats for locking a tool bit therein. These set-screws 45 are mounted in bores 46 and have threaded engagement with the tool post 20, the front end member 16 and the right-hand side member 39.

Formed in the tool post 21, the front end member 16 and the bottom member 47 of the body 14 is a horizontal row of upright tool bit seats 48, 49, 50, 51 and 52. These seats 48, 49, 50, 51 and 52 extend substantially radially relative to the axis and the projected axis of the work passageway 19, are slightly inclined transversely of said axis, and are square in cross-section. The seat 48 is a double seat for two tool bits or a tool bit and a spacer. This seat 48 is formed in part in the tool post 21 and in part in the front end member 16 and extends completely through the tool post 21 and is open, in part, to the work passageway 19. The seat 49 is formed in the front end member 16 and is open to the work passageway 19 and the seats 50, 51 and 52 are formed in the bottom member 47 and are open to the compartment 15.

Set-screws 53 are provided, two for the double seat 48 and one for each of the seats 49, 50, 51 and 52 for locking tool bits therein. These set-screws 53 are mounted in bores 54 in the tool post 21, the front end member 16 and the bottom member 47. In addition to the set-screw 45 for locking a tool bit in the seat 40 is a second set-screw 55 that extends at right angles to the set-screw 45 and has threaded engagement with the tool post 20. Also in addition to the two set-screws 53 for the double seat 49 is a third set-screw 56 that extends at right angles to said set-screws 53 and has threaded engagement with the tool post 21.

Within the compartment 15 is an upper pressure back roller 57 and a left side pressure back roller 58 for holding work when long cuts are made. These two pressure rollers 57 and 58 are mounted on headed studs 59 that extend parallel to the projected axis of the work passageway 19. The studs 59 are tightly fitted in transverse holes 60 in carriers 61 and secured thereto by pins 62. The carriers 61 are mounted in guide channels 63 in the face of a frame 64 in the compartment 15.

The carriers 61 are rigidly held in the guide channels 63 where adjusted by nut-equipped bolts 65 that extend through holes 66 in said carrier and longitudinal slots 67 in the frame 64. The heads 68 of the bolts 65 are rectangular and are mounted in correspondingly formed seats 69 in the carriers 61 and hold the bolts 65 from turning. The frame 64 extends transversely of the compartment 15, rests on the bottom member 47 and has a depending rectangular extension 70 that extends into a longitudinal slot 71 in said bottom member with a working fit and thereby holds the frame 64 for straight-line sliding adjustment.

A screw 72 extends through the slot 71, has threaded engagement with the frame extension 70 and is provided with a collar 73 that bears against the under side of the bottom member 47 as a base of resistance for the screw 72.

Each carrier 61 is moved in its guide channel 63 by a long adjusting screw 74 having threaded engagement with the frame 64. On each screw 74 is a collar 75 that extends into a transverse notch 76 in the respective carrier 61 and couples the screw 74 to said carrier.

In the drawings is shown a round bar $a$ to be turned by the improved box tool 13 to form on said bar a series of steps of different predetermined lengths and different predetermined diameters. This bar $a$ is fed to the box tool 13 by the machine, not shown, on which said box tool is mounted.

As is well known, a commercial round bar, as it is held in a machine to be turned is not absolutely true circumferentially or concentric to the axis of the box tool and hence a slight short cut, as indicated at $b$, is necessary to reduce the diameter of the bar $a$ to bring the same into concentricity. It is also necessary to make this short initial cut $b$ before the pressure rollers 28 are adjusted onto bar $a$ in order that they hold the bar $a$ concentric as the turning progresses. This initial cut $b$ is made by the tool bit 77 forward of the pressure rollers 26 and while said pressure rollers are retracted. At the completion of the cut $b$, the pressure rollers 26 are adjusted onto the periphery of said cut.

The second step in turning the bar $a$ is to cut a relief $c$ which is done by the tool bit 78 for further reducing the diameter of the bar $a$ to a predetermined length, as indicated at $d$. The third step in turning the bar $a$ is to further reduce the diameter of the bar $a$ for a predetermined length by means of the tool bit 80, as indicated at $e$. The fourth and final step in turning the bar $a$ is to still further reduce the diameter of the bar $a$ to a predetermined length, as indicated at $f$, by the tool bit 81.

It may be assumed that the pressure back rollers 58 are retracted and at the time the inner end of the section $f$ of the bar $a$ is fed under said rollers and then they are adjusted onto the periphery of said section $f$. These pressure back rollers 58 serve a very important function in that they securely hold the bar $a$ at its inner end portion concentric to the projected axis of the work passageway 19, thus making it possible to make long deep cuts in the bar $a$.

It will be understood that the invention described is capable of various modifications within the scope of the invention herein disclosed and claimed.

What I claim is:

1. In a box tool, a body member having a compartment and a work passageway in communication with the compartment, a frame in the compartment mounted for adjustment longitudinally of the projected axis of the passageway, two pairs of carriers mounted, the one pair on the face of the body member and the other pair on the frame for adjustments on substantially radial lines extending from said axis, a pair of posts on the face of the body member parallel to said axis, a row of laterally spaced individual tool bit seats in each post and the body member parallel to said axis, certain of the seats leading into the passageway and the others leading into the compartment, said rows of seats being diametrically opposite the pairs of carriers on the face of the body member and arranged to hold tool bits for adjustment substantially on radial lines extending from said axis, means for locking the frame where adjusted, and other means for locking tool bits in the seats.

2. The structure defined in claim 1 in which the tool bit seats in the two rows are staggered.

3. The structure defined in claim 1 in which the distance between the seats in each row is materially less than the width of said seats and in which the seats in the two rows are staggered, whereby overlapping cuts can be made.

4. The structure defined in claim 1 in which the seats in each row extend from the plane of the carriers on the face of the body member substantially to the carriers on the frame when said frame is in its rearmost position.

KARL O. FELLROTH.

REFERENCES CITED

The following references are of record in the file of this patent:

UNITED STATES PATENTS

| Number | Name | Date |
| --- | --- | --- |
| 258,907 | Flower | June 6, 1882 |
| 309,871 | Palmer | Dec. 30, 1884 |
| 748,726 | Hanson | Jan. 5, 1904 |
| 1,683,253 | McConnell | Sept. 4, 1928 |
| 2,321,281 | Collins | June 8, 1943 |
| 2,369,014 | Bruns | Feb. 6, 1945 |
| 2,389,858 | Kyle | Nov. 27, 1945 |